US007953431B2

(12) United States Patent  (10) Patent No.: US 7,953,431 B2
Cheon et al.  (45) Date of Patent: May 31, 2011

(54) MOBILE COMMUNICATION TERMINAL AND MESSAGE DISPLAY METHOD THEREIN

(75) Inventors: Jee Young Cheon, Daegu-si (KR); Dong Jun Weon, Gyeonggi-do (KR); Seon Tae Jo, Gyeonggi-do (KR); Yeon Woo Park, Seoul-si (KR); Sang Hyuck Lee, Seoul-si (KR); Seung Jun Lee, Seoul-si (KR); Soo Jin Jeon, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 41 days.

(21) Appl. No.: 11/534,821

(22) Filed: Sep. 25, 2006

(65) Prior Publication Data

US 2007/0072633 A1  Mar. 29, 2007

(30) Foreign Application Priority Data

Sep. 23, 2005 (KR) .................. 10-2005-0088733
Oct. 1, 2005 (KR) .................. 10-2005-0092692

(51) Int. Cl.
*H04M 1/00* (2006.01)
*H04B 1/38* (2006.01)
(52) U.S. Cl. .................. 455/550.1; 455/563; 455/566
(58) Field of Classification Search .............. 455/550.1, 455/556.1, 556.2, 563, 566, 567
See application file for complete search history.

(56) References Cited

U.S. PATENT DOCUMENTS

| | | | | |
|---|---|---|---|---|
| 5,941,929 | A * | 8/1999 | Shiomi et al. | 701/120 |
| 6,054,990 | A * | 4/2000 | Tran | 715/863 |
| 7,079,871 | B2 * | 7/2006 | Kim | 455/566 |
| 7,283,839 | B2 * | 10/2007 | You et al. | 455/550.1 |
| 2003/0013483 | A1 * | 1/2003 | Ausems et al. | 455/556 |
| 2003/0064707 | A1 * | 4/2003 | Yoneyama | 455/412 |
| 2003/0233237 | A1 * | 12/2003 | Garside et al. | 704/270 |
| 2004/0063445 | A1 * | 4/2004 | Vaananen | 455/466 |
| 2004/0179232 | A1 * | 9/2004 | Inukai et al. | 358/1.15 |
| 2005/0210146 | A1 | 9/2005 | Shimizu | |
| 2006/0286968 | A1 * | 12/2006 | Klassen et al. | 455/412.1 |

FOREIGN PATENT DOCUMENTS

| | | |
|---|---|---|
| EP | 0898405 | 2/1999 |
| KR | 1020030032584 | 4/2003 |
| KR | 2003-62850 | 7/2003 |
| KR | 1020040036481 | 4/2004 |
| KR | 10-2005-0027591 | 3/2005 |
| WO | 01/80535 | 10/2001 |

OTHER PUBLICATIONS

Joong Nam Kim: "IMT-2000 fundamental structure", Shin-Han Publications, Republic of Korea, Sep. 25, 2001.

* cited by examiner

*Primary Examiner* — Michael T Thier
(74) *Attorney, Agent, or Firm* — Lee, Hong, Degerman, Kang & Waimey

(57) ABSTRACT

A method is provided for displaying a message in a mobile communication terminal. According to one example, the method includes the steps of receiving a first message, displaying the first message on a first display of the terminal, and displaying a message preparation window on a second display of the terminal simultaneously with the display of the first message. Since the terminal user can prepare a response text message to a received text message while viewing the received text message, the preparation of the response text message can be more conveniently achieved.

11 Claims, 8 Drawing Sheets

(5-1)　　　(5-2)

(5-3)　　　(5-4)

MOBILE COMMUNICATION TERMINAL AND MESSAGE DISPLAY METHOD THEREIN

RELATED APPLICATIONS

This application claims the benefit of Korean Patent Application Nos. 10-2005-0088733, filed on Sep. 23, 2005, and 10-2005-0092692 filed on Oct. 1, 2005, which are hereby incorporated by reference in their entirety.

BACKGROUND OF THE INVENTION

1. Field of the Invention

The present invention relates to a mobile communication terminal, and more particularly, to a method for displaying messages on a mobile communication terminal, the terminal being configured to perform message transmission and reception.

2. Discussion of the Related Art

In recent times, with the increasing development of information communication technologies, information and communication environments have changed rapidly. Particularly, mobile communication terminals have been considered to be requisites for modem society, and have been widely used throughout the world. With the increasing demands of users due to the widespread use of the above-mentioned mobile communication terminals, in addition to general voice call functions, a variety of additional functions have been added to the mobile communication terminals.

Recently, brief communication through text messages according to short message services (SMS) has greatly increased among users of mobile communication terminals and among younger users in particular. Generally, when one user contacts another user using a text message or asks the other user a question using a text message, the other user tends to respond using a text message.

However, conventional mobile communication terminals have various shortcomings in preparing text messages. For example, when a user who has received a text message from the other user prepares a response message, the preparation of the response message must be carried out under the condition in which the content of the received text message is not displayed. For this reason, if the user forgets the content of the received text message during the preparation of a response to the received text message, to identify the content of the received text message he must open the received text message after closing a message preparation window used for the preparation of the response message. In order to again prepare the response message, the user must then again open the message preparation window, and repeat the preparation of the response message.

Furthermore, there is a problem in that, when a text message from a third party is received during preparation of a text message, the content of the currently-prepared text message is lost.

Meanwhile, frequent use of text messages through a mobile communication terminal results in an increase in the amount of transmitted and received text messages stored in the terminal. Accordingly, it would be desirable to provide a method enabling more convenient retrieval of previously-received or transmitted text messages.

SUMMARY OF THE INVENTION

Accordingly, the present invention is directed to a mobile communication terminal and a method for displaying the message on the mobile communication terminal that overcome one or more problems, limitations or disadvantage of the related art.

A method is provided for displaying a message. According to one example, the method includes the steps of receiving a first message, displaying the first message on a first display of the terminal, and displaying a message preparation window on a second display of the terminal simultaneously with the display of the first message.

According to another example, a mobile communication terminal is provided that includes a message processor for selectively transmitting and receiving a message and at least two displays. The two displays include a first display and a second display. The first display is configured to display received messages, and the second display is configured to display a message preparation window. According to such an example, the communication terminal also includes a controller for controlling the message processor and the first and second displays.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention associated with a method for displaying messages in a mobile communication terminal. According to one example, the method includes displaying received messages on a first display simultaneously with a message presentation window, which is displayed on a second display. Such a configuration allows a terminal user to more conveniently prepare a response text message to a received text message because the terminal user can prepare the response text message while viewing the received text message. Wherever possible, the same reference numbers will be used throughout the drawings to refer to the same or like parts.

The present invention may be applied not only to a mobile communication terminal having two displays, but also to a mobile communication terminal having three or more displays. For the simplicity of description, however, the following description will be given in conjunction with the case in which the present invention is applied to a mobile communication terminal having two displays. Therefore, it should be noted that the present invention is not limited to the following description and embodiments.

Figure 1:
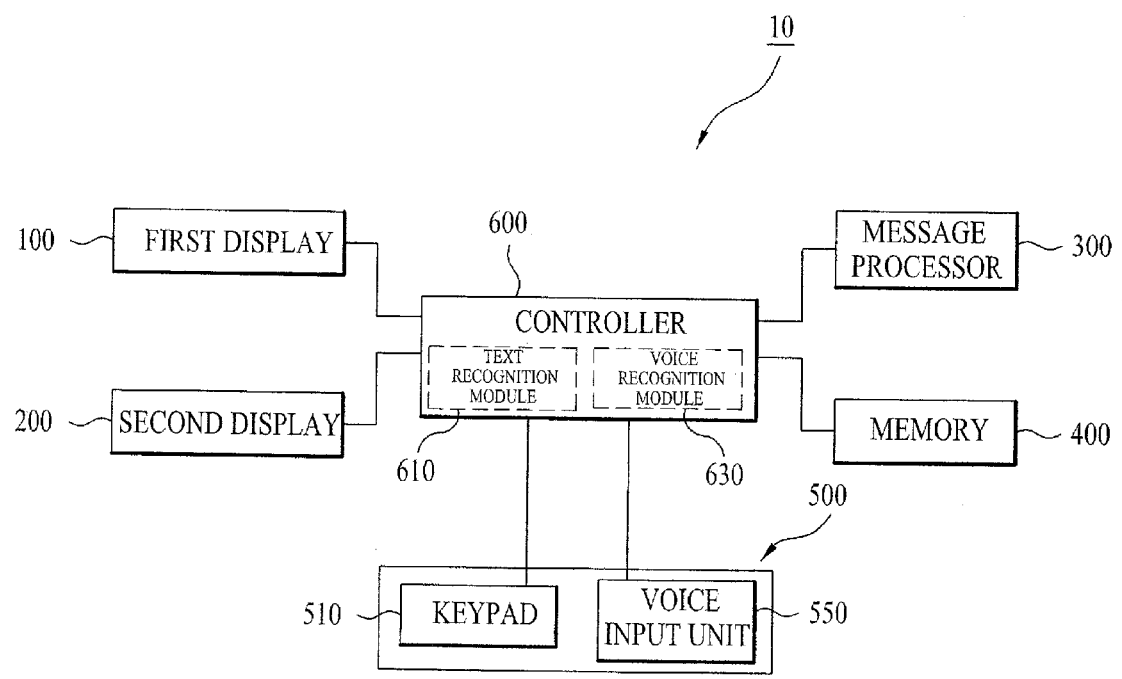
FIG. 1 is a block diagram schematically illustrating a configuration of a mobile communication terminal according to the present invention.

FIG. 1 is a block diagram schematically illustrating a configuration of a mobile communication terminal according to the present invention.

As shown in FIG. 1, the mobile communication terminal according to the present invention, which is designated by reference numeral 10, includes a first display 100, a second display 200, a message processor 300, a memory 400, an input unit 500, and a controller 600. The mobile communication terminal 1 according to the present invention may include not only the above-mentioned components but also other constituent components (e.g., a voice communication module (not shown), etc.), but the above-mentioned other constituent components are not directly related to the present invention, such that their detailed description will herein be omitted for the sake of brevity.

The illustrated constituent elements of the mobile communication terminal according to the present invention will be described in detail.

Preferably, the first display 100 is a touch screen. In a general standby mode, the first display 100 displays key buttons for inputting a telephone number (see "2-1" in FIG. 2).

The second display 200 is a main display in the terminal 10. The second display 200 displays information required for use of the terminal 10, a text message, and the like. Similarly to the first display 100, the second display 200 is preferably constituted by a touch screen, to provide operation convenience to the terminal user.

The message processor 300 functions to perform signal processing for transmission or reception of a message. The message processor 300 mainly transmits or receives text messages. Herein, "text messages" mean all types of messages which may include a text. Conceptually, text messages include, but are not limited to, short message service (SMS) messages, E-mail messages, and multimedia message service (MMS) services.

The memory 400 is a space in which programs necessary for management and operation of the mobile communication terminal 10, and various information and data desired by the user are stored. In particular, the memory 400 is configured to store text messages transmitted from or received by the mobile communication terminal 10.

The input unit 500 allows the terminal user to input various commands or information to the mobile communication terminal 10. Where the first and second displays 100 and 200 are not touch screens, the input unit 500 may be part of the mobile communication terminal 10. Otherwise, the input unit 500 may be an optional component of the mobile communication terminal 10. Preferably, the input unit 500 not only includes a general keypad 510, but also includes a voice input unit 530.

The controller 600 is configured to control all of the components of the mobile communication terminal 10 including the first display 100, second display 200, message processor 300, memory 400, and input unit 500. Where at least one of the first and second displays 100 and 200 is constituted by a touch screen, the controller 600 may be configured to be equipped with a text recognition module 61 0 for recognizing a handwritten input on the touch screen. The controller 600 may also be configured to be equipped with a voice recognition module 630 for recognizing a voice input through the voice input unit 530.

Hereinafter, various embodiments of a method for displaying a text message in the mobile communication terminal having the above-described configuration will be discussed in accordance with the present invention.

First Embodiment

The first embodiment of the present invention relates to method for displaying a text message in the mobile communication terminal. The method allows the user to prepare a response text message to a text message while viewing the received text message.

The first embodiment will be described in detail with reference to FIGS. 2 and 3.

Figure 2:
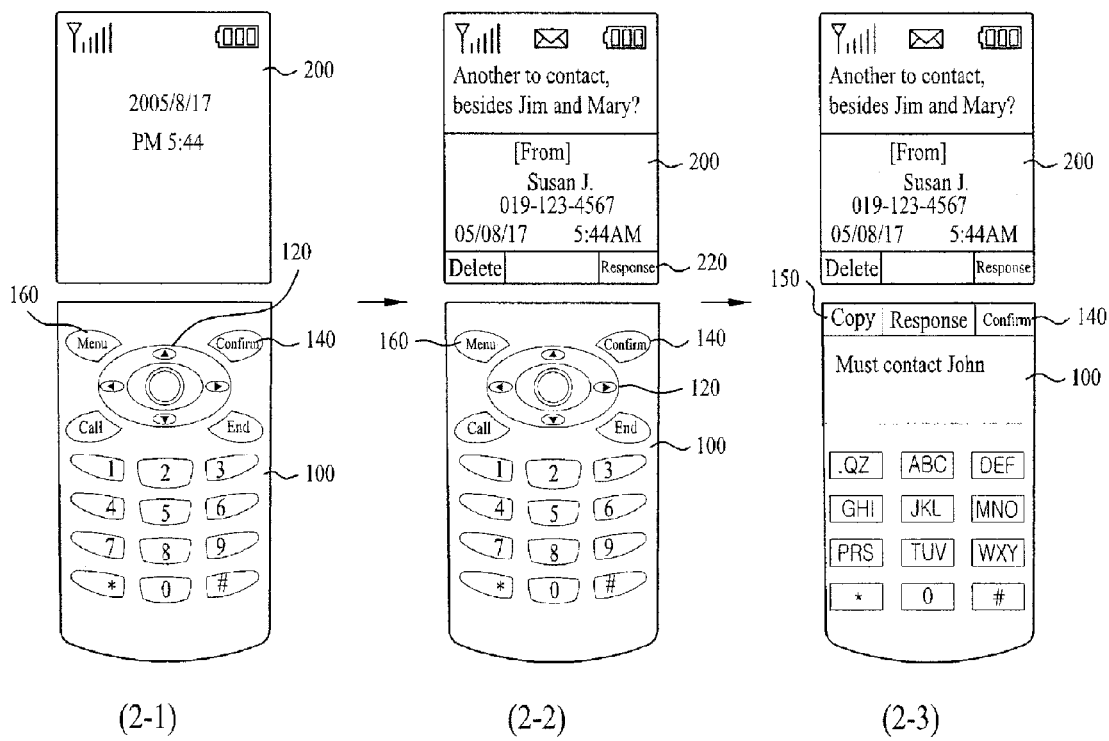
FIGS. 2 and 3 are schematic views illustrating visual output displayed on first and second displays, respectively, in order to explain a text message display method according to a first embodiment of the present invention.
Figure 2:
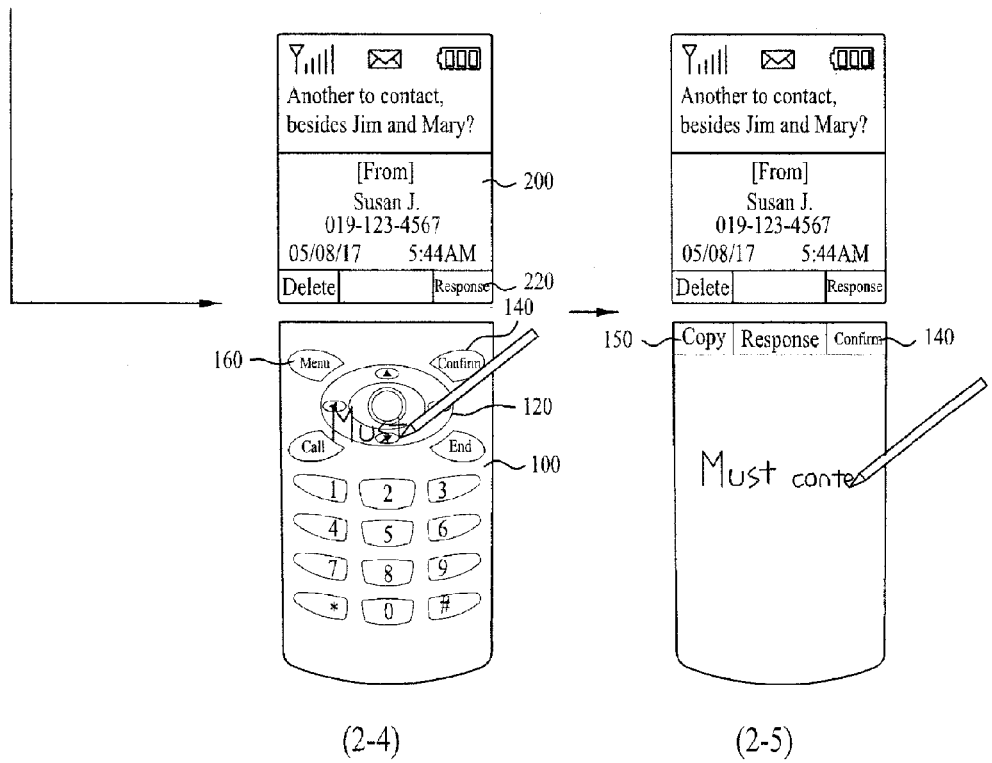
Figure 3:
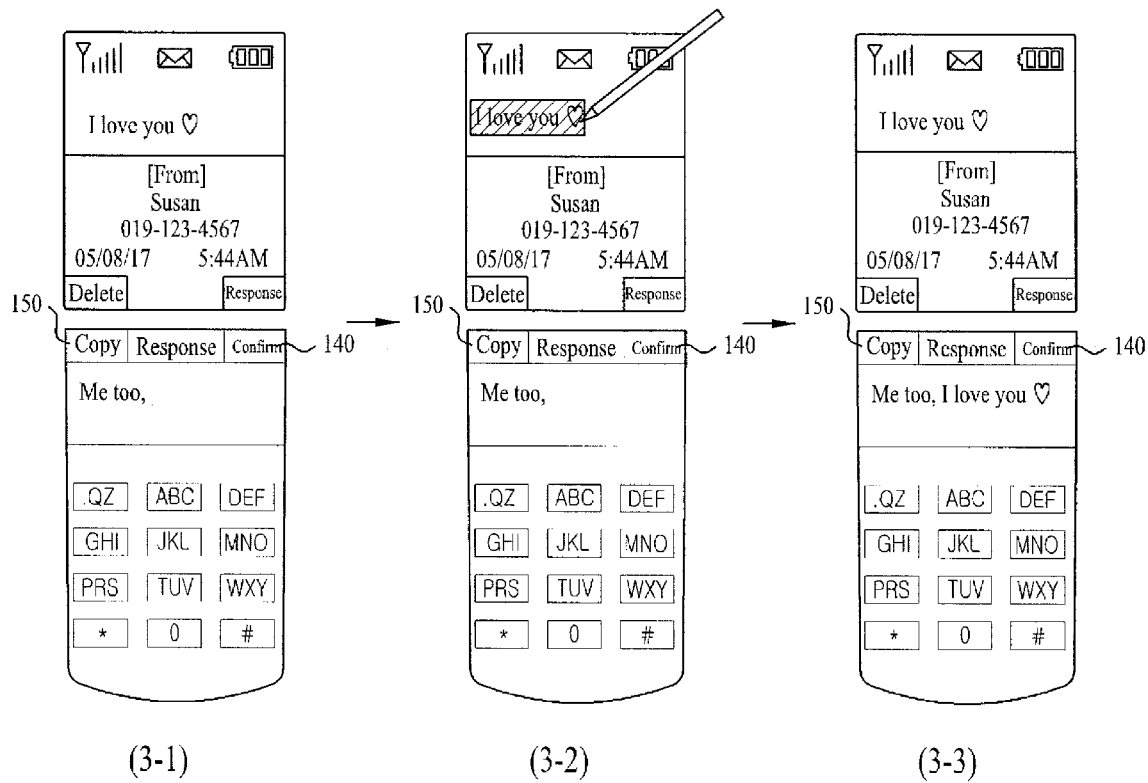

FIGS. 2 and 3 illustrate visual output displayed on the first and second displays, respectively, in order to explain the method according to the first embodiment of the present invention.

In accordance with this embodiment, in a general standby mode, the mobile communication terminal 10 displays a visual output as shown in "2-1" of FIG. 2. That is, general key buttons for enabling input of a telephone number, etc. are displayed on the screen of the first display 100. Meanwhile, a current terminal status (current date, current time, RF reception strength, etc.) is displayed on the screen of the second display 200.

When the mobile communication terminal 10 receives a text message in the general standby mode, the visual output displayed on the screen of the second display 200 of the mobile communication terminal 10 is changed as shown in "2-2" of FIG. 2. That is, although the screen of the first display 100 displays the same visual output as "2-1" of FIG. 2, the screen of the second display 200 displays the content of the received text message, message reception information (for example, information as to the name and telephone number of the transmitter, and the reception time), and icons for processing of the text message (for example, "Delete" and "Response").

When the terminal user desires to prepare a response to the received text message, the user activates the icon "Response" on the screen of the second display 200 as shown in "2-2" of FIG. 2, by using navigation controls 120 (upper, lower, left, and right cursor key icons) displayed on the screen of the first display 100, and then pressing a "Confirm" icon 140 on the screen of the first display 100. When the "Confirm" icon 140 is activated, the screen of the first display 100 is changed as "2-3" of FIG. 2. Alternatively, where the second display 200 is a touch screen, a configuration may be implemented in which the "Response" icon 220 on the screen of the second display 200 is selected when it is directly touched by a stylus pen or the user's finger.

In the state as shown in "2-3" of FIG. 2, the screen of the second display 200 still displays the content of the received text message as show in "2-2" of FIG. 2, in order to enable the terminal user to refer to the displayed text message content during preparation of a response message. Also, the first display 100 displays a text message preparation window for preparation of a response text message. Accordingly, the terminal user can prepare a response text message while continuously viewing the content of the received text message.

Although a configuration has been described in which the picture as shown in "2-3" of FIG. 2 is displayed when the "Response" icon as shown in "2-2" of FIG. 2 is selected other implementations are possible. For example, according to another configuration shown in "2-4", when the terminal user starts handwriting on the touch screen of the first display 100 (touch screen) as shown in "2-1" of FIG. 2, a text message preparation window for handwriting as shown in "2-5" of FIG. 2 is displayed without any icon operation. In this case, the handwritten response text message may be sent after being converted to text, or may be sent in the form of an image file without conversion.

Additionally, it may be possible to implement a configuration in which the text message preparation window is displayed when the terminal user inputs a voice command, through the voice input unit 550 of the input unit 500, in place of a separate icon operation. For example, the user may say the word "response" as a voice command. In addition, it may be possible to implement a configuration in which, when the content of a response is input in the form of a voice command, the voice response content is speech-to-text (STT)-converted in the voice recognition module 630 so that it is input to the text message preparation window as text.

In addition, a configuration may be implemented to directly display the text message preparation window without requirement of any key button operation when a text message is received, namely, to change the screen from the picture as shown in "2-1" of FIG. 2 to the picture as shown in "2-3" of FIG. 2.

When the terminal user selects the "Confirm" icon 140 on the screen of the first display 100 after finishing the response preparation in the displayed text message preparation window, the preparation of the response text message is completed.

Further, a configuration may be implemented to enable "block copy" of a portion of the message content displayed on the screen of the second display 200, and thus, to enable "block paste" of the block-copied message content portion in the text message preparation window of the first display 100. These functions may be desirable when the second display includes a touch screen. This will be described in more detail with reference to FIG. 3.

For example, when a text message "I love you ♡" is received, the terminal user first inputs "Me too", as shown in "3-1" of FIG. 3. Next, the information user block-designates "I love you ♡" in the received text message, as shown in "3-2" of FIG. 3, and then selects the "Copy" icon 150 on the screen of the first display 100. As a result, a response text message "Me too, I love you ♡" is completed, as shown in "3-3" of FIG. 3. When the terminal user then selects the "Confirm" icon 140, transmission of the response text message "Me too, I love you ♡" is completed.

The above-described "block-copy" and "block-paste" functions may be useful when the second display includes a touch screen, as described above. However, even when the second display does not include a touch screen, it will be appreciated by those skilled in the technical field that the "block-copy" and "block-paste" functions also can be implemented using an appropriate key operation or key input carried out with "Menu" and "Navigation" icons.

Second Embodiment

The second embodiment of the present invention relates to a method for displaying a text message in the mobile communication terminal which is capable of displaying a retrieval window to allow the terminal user to retrieve a text message stored in the terminal. The method further allows the mobile communication terminal to display a text message preparation window to allow the terminal user to prepare a text message associated with a selected text message.

The second embodiment will be described in detail with reference to FIG. 4.

Figure 4:
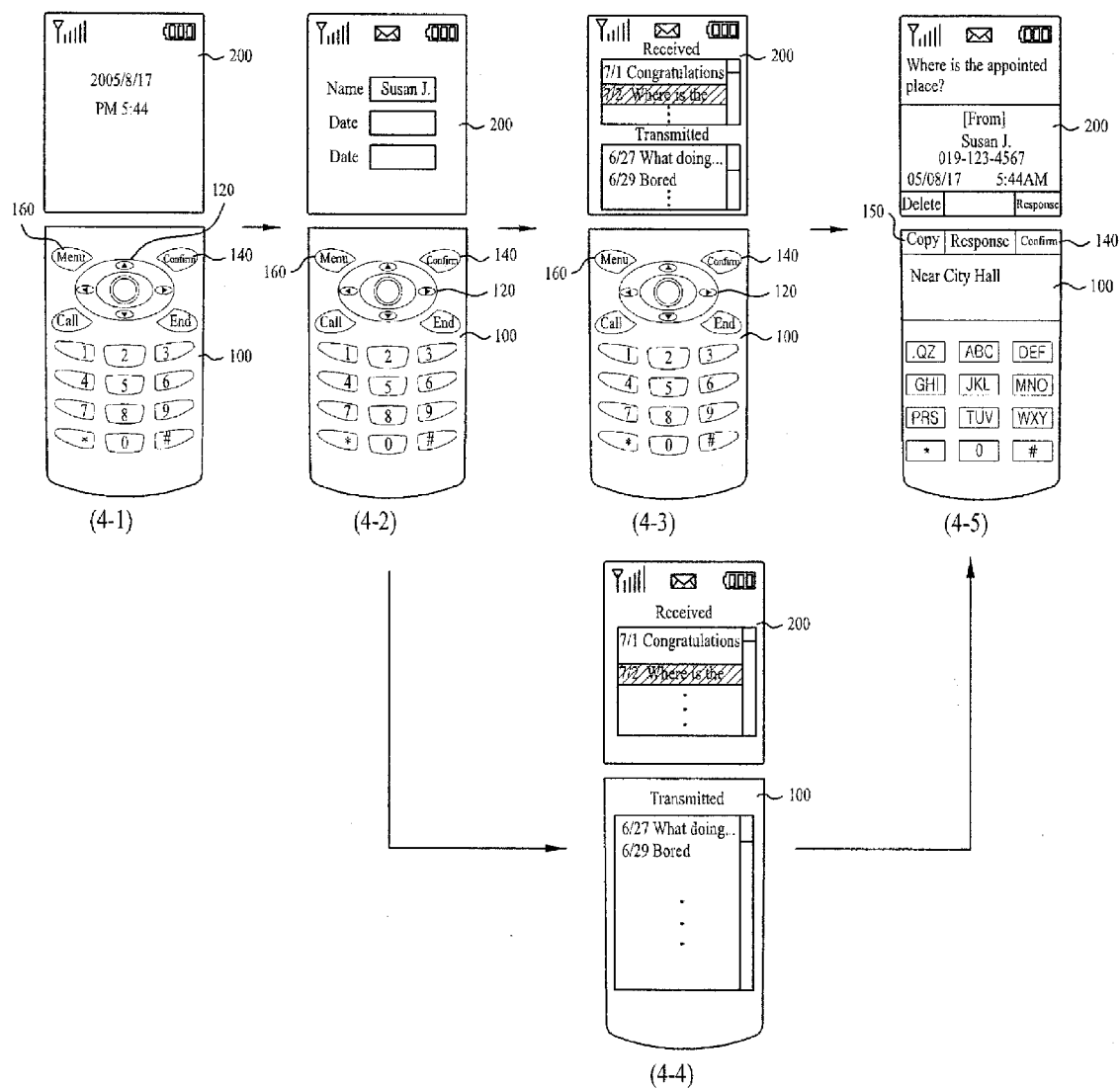
FIG. 4 is a schematic view illustrating visual output displayed on first and second displays, respectively, in order to explain a text message display method according to a second embodiment of the present invention.

FIG. 4 illustrates a visual output displayed on the first and second displays, respectively, in order to explain the text message display method according to the second embodiment of the present invention.

In accordance with this embodiment, when the terminal user operates the terminal to access a text message retrieval mode using a "Menu" icon 160, a retrieval window as shown in "4-2" of FIG. 4 is displayed. The retrieval window may be configured to allow retrieval of a message using one of transmitter/receiver name, transmission/reception date, key word, etc. as a single retrieval condition, or to retrieve the message using a combination of the above retrieval conditions using logical operators such as AND or OR.

As shown "4-2" of FIG. 4, the picture displayed on the screen of the display 200, illustrates the case in which a retrieval is carried out using the transmitter/receiver name "Susan J." as a single retrieval condition. When the terminal user inputs "Susan J." in a transmitter/receiver name item in the retrieval window and then selects the "Confirm" icon 140 on the first display 100, all the text messages transmitted from the terminal user to Susan J., and transmitted from Susan J. to the terminal user are retrieved from the memory 400, which stores all transmitted and received text messages. The retrieved messages are then displayed.

Preferably, the retrieved text messages are grouped into a transmitted text message group and a received text message group so that they are displayed in the form of a list.

Where the second display 200 is not a touch screen, it may be desirable that both the transmitted text message group and the received text message group be displayed on the second display 200, as shown in "4-3" of FIG. 4. In this case, it may be possible to implement a configuration in which one of the displayed text messages is selected in accordance with operations of the "Navigation" icon 120 and "Confirm" icon 140 on the first display 100.

Where the second display 200 is a touch screen, it may be desirable that one of the transmitted and received text message groups be displayed on the first display 100, and the other text message group be displayed on the second display 200 as shown in "4-4", in order to enable the terminal user to view a larger number of text messages at one time. In this case, the terminal user can select one of the displayed text messages by directly touching the text message to be selected using a stylus pen or the finger.

When one of the retrieved text messages, which are displayed in various manners, is selected, the content of the selected text message is displayed, as shown in "4-5" of FIG. 4. In association with the selected text message, a text message preparation window is also displayed, in order to enable the terminal user to prepare a text message.

Since diverse Embodiments associated with input of a text message in the text message preparation window have been described in conjunction with the first embodiment, no further description thereof will be given for the sake of brevity.

Third Embodiment

The third embodiment of the present invention relates to a text message display method in the mobile communication terminal which is capable of retaining a text message, which is being prepared, even when a text message is received during the preparation of the text message.

The third embodiment will be described in detail with reference to FIG. 5.

Figure 5:
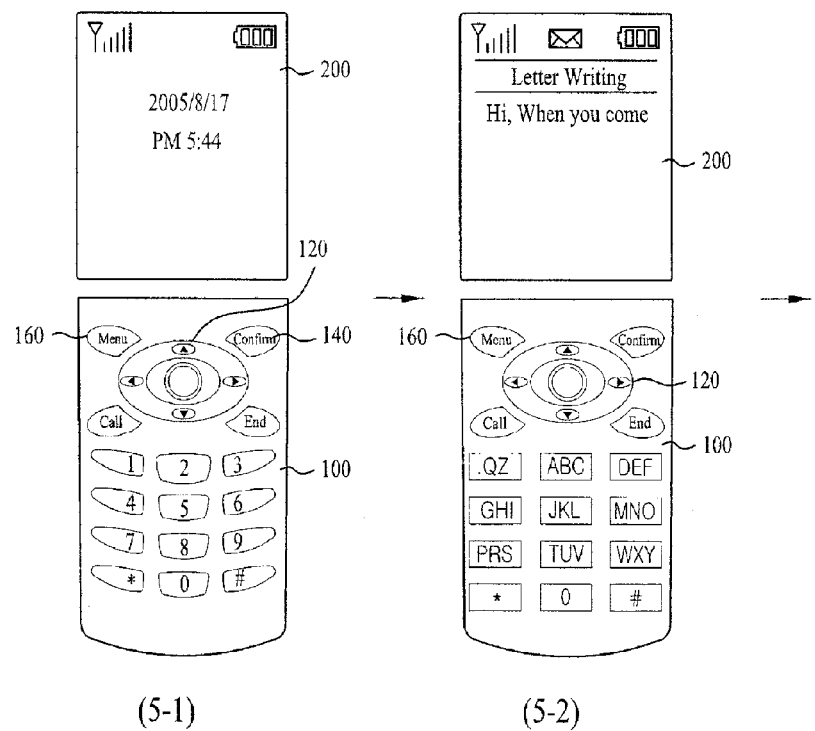
FIG. 5 is a schematic view illustrating visual output displayed on first and second displays, respectively, in order to explain a text message display method according to a third embodiment of the present invention.
Figure 5:
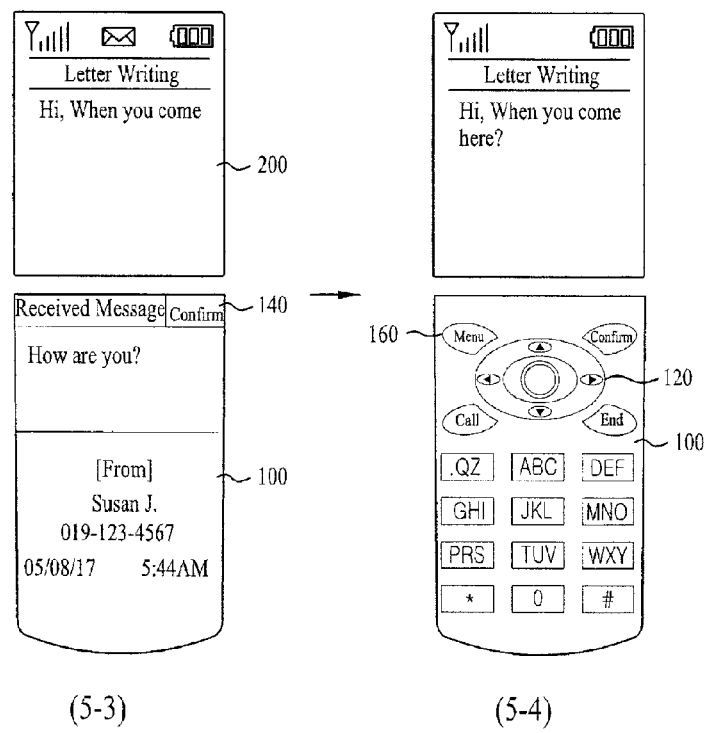

FIG. 5 illustrates a visual output displayed on the first and second displays, 100 and 200 respectively, in order to explain the text message display method according to the third embodiment of the present invention.

In accordance with this embodiment, when the terminal user activates a text message letter writing menu by selecting the "Menu" icon 160 in the general standby mode, visual outputs as shown in "5-2" of FIG. 5 are displayed on the first and second displays 100 and 200, respectively. In particular, according to the example shown in "5-2" of FIG. 5, a keypad for writing a text message is displayed on the first display 100. Also, on the second display 200, a message displaying window is displayed. Accordingly, the terminal user can compose a text message using the letter writing window, as shown in "5-2" of FIG. 5.

When a text message is received during the preparation of the text message as shown in "5-2" of FIG. 5, the first and second displays 100 and 200 display visual outputs as shown in "5-3" of FIG. 5, respectively. That is, as shown in "5-3" of FIG. 5, the screen of the second display 200 still displays the message which is being prepared. On the other hand, the screen of the first display 100 displays the content of the received text message, as shown in "5-3" of FIG. 5. Accordingly, the terminal user can view the received text message while maintaining the text message which is being prepared.

When the terminal user selects the "Confirm" icon 140 on the visual output as shown in "5-3" of FIG. 5 after viewing the received text message, the keypad for text message preparation is displayed again on the first display 100, as shown in "5-4" of FIG. 5. Accordingly, the terminal user can complete the text message which is being prepared.

Fourth Embodiment

The fourth embodiment of the present invention relates to a method for displaying a text message in the mobile communication terminal which is capable of displaying text messages stored in the terminal in a grouped state, thereby enabling the terminal user to easily search for a desired one of the stored text messages.

The fourth embodiment will be described in detail with reference to FIG. 6.

Figure 6:
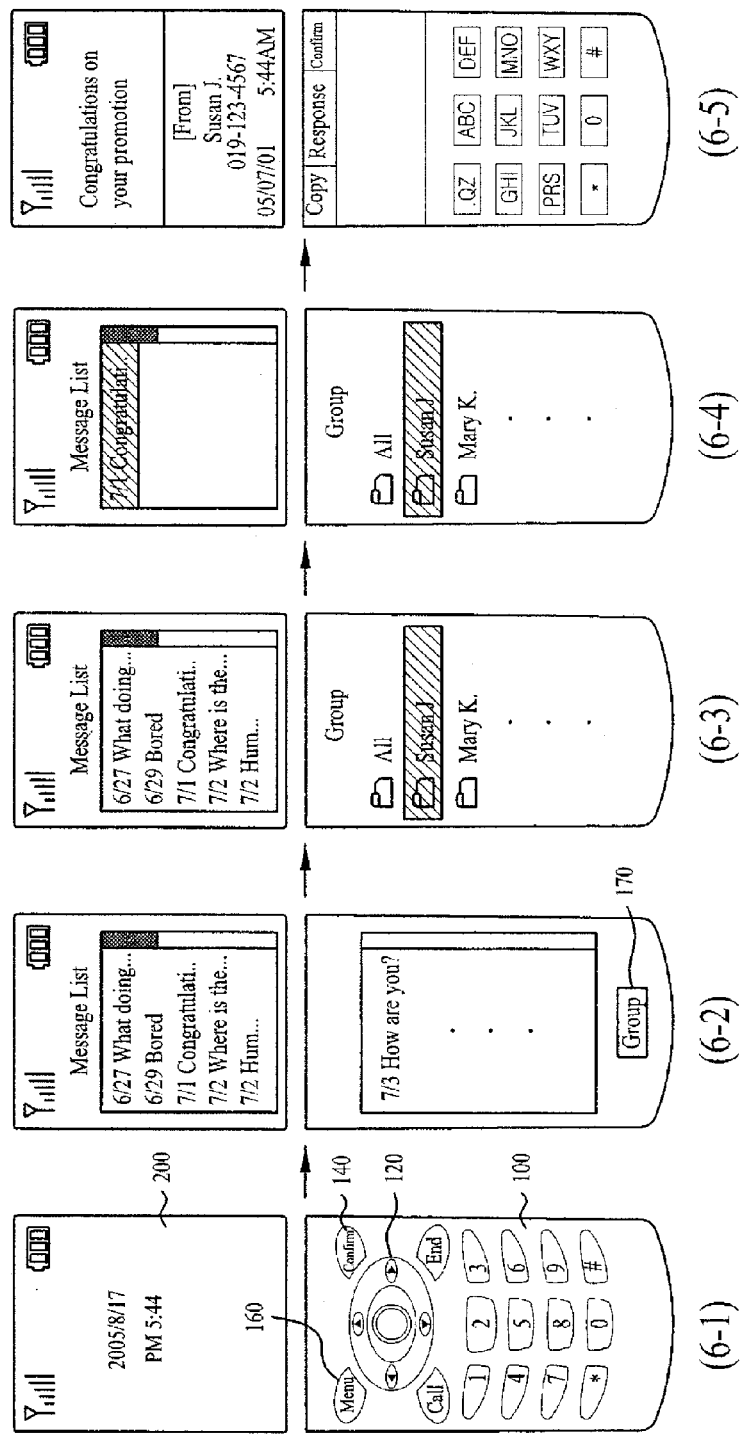
FIG. 6 is a schematic view illustrating visual output displayed on first and second displays, respectively, in order to explain a text message display method according to a fourth embodiment of the present invention.

FIG. 6 illustrates visual outputs displayed on the first and second displays, respectively, in order to explain the method according to the fourth embodiment of the present invention.

In accordance with this embodiment, in the general standby mode, the mobile communication terminal 10 displays a visual output as shown in "6-1" of FIG. 6. That is, general key buttons for input of a telephone number, etc. are displayed on the screen of the first display 100. On the screen of the second display 200, the current terminal status (current date, current time, wave reception status, etc.) is displayed.

When using the "Menu" icon 160, the terminal user is able to operate the terminal 10 to display a list of all transmitted and received text messages. In particular, changing the terminal 10 from the general standby mode to a list display mode, causes the first and second displays 100 and 200 to display visual output as shown in "6-2" of FIG. 6. That is, the screens of the first and second displays 100 and 200 successively display the list of all transmitted and received text messages stored in the memory 400 in the order of transmission or reception times. Although not shown in FIG. 6, each of the listed text messages may be assigned an identification symbol representing whether the text message is a transmitted text message or a received text message This may be equivalently applied to embodiments, which will be described hereinafter.

When the terminal user then selects a "Group" icon 170 on the first display 100, the first and second displays 100 and 200 display visual outputs as shown in "6-3" of FIG. 6, respectively. That is, the second display 200 still displays the message list, whereas the first display 100 displays groups of the listed messages grouped into one or more groups on the basis of message transmission and reception information. The message transmission and reception information may be the names or telephone numbers of the transmitters/receivers, or the transmission/reception dates. The message transmission and reception information is not limited to such information, and may be equivalently applied to embodiments which will be described hereinafter.

When the terminal user then selects one of the groups displayed on the first display 100, for example, a group "Susan J.", the second display 200 displays a list of the text messages transmitted from "Susan J." to the terminal user and the text messages transmitted from the terminal user to "Susan J.", as shown in "6-4" of FIG. 6.

When the terminal user then selects one of the listed text messages, the second display 200 displays the content of the selected text message, as shown in "6-5" of FIG. 6. Simultaneously, the first display 100 displays a text message preparation window, together with a keypad, in order to allow the terminal user to prepare a text message in association with the selected text message. Accordingly, the terminal user can prepare a text message using the displayed text message preparation window and keypad.

Since diverse Embodiments associated with input of a text message in the text message preparation window have been described in conjunction with the first embodiment, no further description thereof will be given for the simplicity of description.

Fifth Embodiment

In the fourth embodiment of the present invention, the list of all transmitted and received text messages is displayed on the first and second displays 100 and 200. In the fifth embodiment of the present invention, however, a configuration is implemented in which only the list of the transmitted text messages or the list of the received text messages is displayed on the first and second displays 100 and 200. This will be described in detail with reference to FIG. 7.

Figure 7:
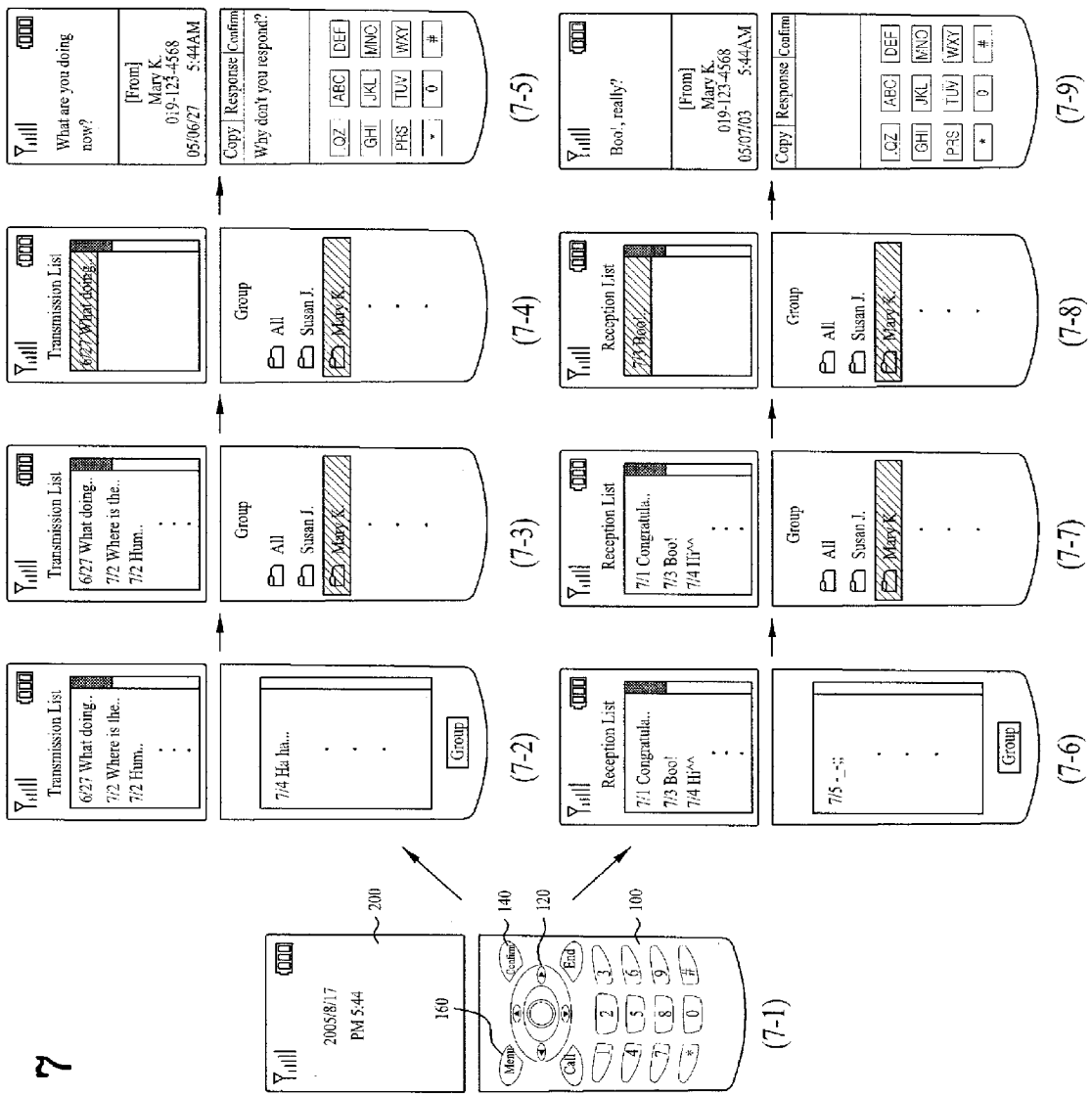
FIG. 7 is a schematic view illustrating visual output displayed on first and second displays, respectively, in order to explain a text message display method according to a fifth embodiment of the present invention.

FIG. 7 illustrates visual outputs displayed on the first and second displays, respectively, in order to explain the method of displaying a text message according to the fifth embodiment of the present invention.

In accordance with this embodiment, the terminal user is able to perform an operation to display only the list of transmitted text messages after activating the list display mode using the "Menu" icon 160. When the user performs such an operation, the first and second displays 100 and 200 display visual outputs as shown in "7-2" of FIG. 7, respectively. In particular, the screens of the first and second displays 100 and 200 successively display the list of all text messages transmitted from the terminal user and stored in the memory 400 in the order of transmission times.

When the terminal user then selects the "Group" icon 170 on the first display 100, the first and second displays 100 and 200 display visual output as shown in "7-3" of FIG. 7, respectively. More specifically, the second display 200 still displays the message list, whereas the first display 100 displays groups of the listed messages grouped into one or more groups on the basis of message transmission information.

When the terminal user then selects one of the groups displayed on the first display 100, for example, a group "Mary K.", the second display 200 displays a list of the text messages transmitted from the terminal user to "Mary K.", as shown in "7-4" of FIG. 7.

When the terminal user then selects one of the listed text messages, the second display 200 displays the content of the selected text message, as shown in "7-5" of FIG. 7. Simultaneously, the first display 100 displays a text message preparation window, together with a keypad, in order to enable the terminal user to prepare a text message in association with the selected text message. Accordingly, the terminal user can prepare a text message using the displayed text message preparation window and keypad.

On the other hand, when the terminal user performs an operation to display only the list of received text messages after activating the list display mode using the "Menu" icon 160 on the general standby mode picture, the first and second displays 100 and 200 display visual outputs as shown in "7-6" of FIG. 7, respectively. That is, the screens of the first and second displays 100 and 200 successively display the list of all text messages received by the terminal user and stored in the memory 400 in the order of reception times.

Procedures of grouping the listed text messages, selecting one of the grouped text messages, and preparing a text message in association with the selected text message, such as the procedures respectively corresponding to "7-7" to "7-9" of FIG. 7, are then carried out. These procedures are very similar to those described in conjunction with "7-2" to "7-5" of FIG. 7. Accordingly, no further description of these procedures will be given for the simplicity of description.

Since diverse Embodiments associated with input of a text message in the text message preparation window have been described in conjunction with the first embodiment, no further description thereof will be given for the simplicity of description.

Sixth Embodiment

In the sixth embodiment of the present invention, a configuration is implemented in which the first display 100 displays a list of received text messages (or a list of transmitted text messages), whereas the second display 200 displays a list of transmitted text messages (or a list of received text messages), differently from the above-described fourth and fifth embodiments. This will be described in detail with reference to FIG. 8.

Figure 8:
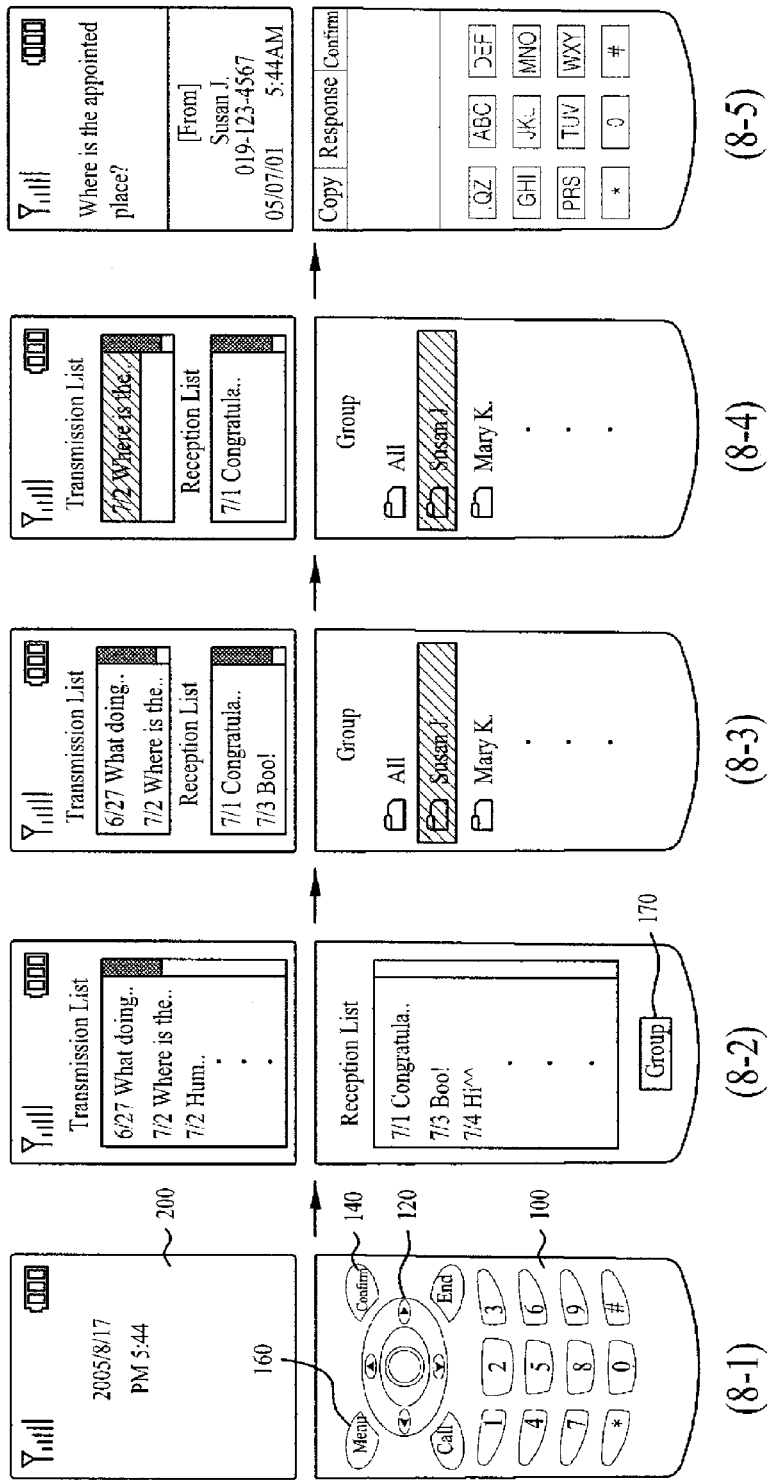
FIG. 8 is a schematic view illustrating visual output displayed on first and second displays, respectively, in order to explain a text message display method according to a sixth embodiment of the present invention.

FIG. 8 illustrates visual outputs displayed on the first and second displays, respectively, in order to explain the method of displaying a text message according to the sixth embodiment of the present invention.

In accordance with this embodiment, the terminal user is able to perform an operation to display the list of received text messages on the first display 100 and to display the list of transmitted text messages on the second display 200. Thereafter, the user is able to activate the list display mode using the "Menu" icon 160 on the general standby mode picture, thereby causing the first and second displays 100 and 200 to display visual output as shown in "8-2" of FIG. 8, respectively. In particular, the screen of the first display 100 displays the list of all text messages received by the terminal user and stored in the memory 400 in the order of reception times. Simultaneously, the screen of the second display 200 displays the list of all text messages transmitted from the terminal user and stored in the memory 400 in the order of transmission times.

When the terminal user then selects the "Group" icon 170 on the first display 100, the first and second displays 100 and 200 display visual outputs as shown in "8-3" of FIG. 8, respectively. That is, the second display 200 separately displays the lists of the transmitted and received text messages. Simultaneously, the first display 100 displays groups of the listed messages grouped into one or more groups on the basis of message transmission or reception information.

When the terminal user then selects one of the groups displayed on the first display 100, for example, a group "Susan J.", the second display 200 separately displays a list of the text messages transmitted from the terminal user to "Susan J." and a list of the text messages transmitted from "Susan J." to the terminal user, as shown in "8-4" of FIG. 8.

When the terminal user then selects one of the text messages listed in the two lists, the second display 200 displays the content of the selected text message, as shown in "8-5" of FIG. 8. Simultaneously, the first display 100 displays a text message preparation window, together with a keypad, in order to enable the terminal user to prepare a text message in association with the selected text message. Accordingly, the terminal user can prepare a text message using the displayed text message preparation window and keypad.

Since diverse Embodiments associated with input of a text message in the text message preparation window have been described in conjunction with the first embodiment, no further description thereof will be given for the simplicity of description.

The above-described mobile communication terminal and text message display method therein according to the present invention have various effects as follows.

First, in accordance with the present invention, there is an advantage in that it is possible to more conveniently prepare a response text message to a received text message because the terminal user can prepare the response text message while viewing the received text message.

Second, in accordance with the present invention, it is possible to more conveniently retrieve text messages stored in the terminal even when the amount of the stored text messages is increased due to frequent and extended use of text messaging services. Accordingly, there is an advantage in that it is possible to conveniently prepare a text message associated with a retrieved text message.

Third, in accordance with the present invention, there is an advantage in that it is possible to confirm a text message received during preparation of a text message, and to successively perform the preparation of the text message, which has not been completed, after the confirmation of the received text message.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A message display method in a mobile communication terminal, the method comprising:
 receiving a message from a specific party;
 displaying the received message from the specific party on a first display portion of a display of the terminal;
 displaying a message editing interface on a second display portion of the terminal to enable editing a response message to the received message from the specific party via user contact with the second display portion of the terminal, wherein the first display portion and the second display portion are displayed on at least one touch screen of the terminal;

transmitting the response message to the specific party;

storing previously received messages and previously transmitted messages, the previously received messages including the message received from the specific party and messages received from other parties, and the previously transmitted messages including the response message transmitted to the specific party and messages transmitted to other parties;

displaying a list comprising distinct names or distinct telephone numbers of sources of the previously received messages and recipients of the previously transmitted messages, the list including the name or telephone number of the specific party, wherein a message previously received from one source of the list is displayed simultaneously with the displaying of the list;

selecting the specific party from the list to retrieve only messages received from the specific party among the previously received messages and messages previously transmitted to the specific party among the previously transmitted messages;

displaying a first message list on the display of the terminal;

displaying a second message list on the display of the terminal, wherein the first message list includes the previously received messages of only a single party, which is the specific party, and wherein the second message list includes the previously transmitted messages of only a single party, which is the specific party, and wherein the first message list is distinct from the second message list;

displaying simultaneously, on the display, message received dates and message transmission dates, wherein the message received dates and the message transmission dates are displayed to be aligned vertically, relative to each other, and at locations within the first message list and the second message list;

providing a message input mode responsive to user input, wherein the message input mode permits user entry of a message for sending to the specific party, wherein the message input mode is provided after the first message list and the second message list have been displayed for a period of time, and wherein during the period of time, no message editing interface is displayed;

displaying, while in the message input mode, content associated with a message of the first message list on the first display portion of the terminal; and displaying, while in the message input mode, the message editing interface on the second display portion of the terminal, wherein the message editing interface includes a soft keypad.

2. The method of claim 1, wherein the mobile communication terminal further comprises an input unit configured for voice input and voice recognition, and wherein the response message is prepared by a voice via the input unit.

3. The method of claim 1, wherein at least a portion of a content of the received message from the specific party can be copied and pasted into the message editing interface.

4. A mobile communication terminal, comprising:
a touch screen;
a message processing unit for transmitting or receiving a message;
at least two display portions including a first display portion and a second display portion for displaying the received message and to simultaneously display a message editing interface for enabling creation of a response message to the received message via user contact with the second display portion, the first display portion and the second display portion being included in the touch screen; and
a controller for controlling the message processing unit and the touch screen, wherein the controller is configured to:
transmit the response message to a specific party;
store previously received messages and previously transmitted messages, the previously received messages including a message received from the specific party and messages received from other parties, and the previously transmitted messages including the response message transmitted to the specific party and messages transmitted to other parties;
cause displaying of a list comprising distinct names or distinct telephone numbers of sources of the previously received messages and recipients of the previously transmitted messages, the list including the name or telephone number of the specific party, wherein a message previously received from one source of the list is displayed simultaneously with the displaying of the list;
select the specific party from the list to retrieve only messages received from the specific party among the previously received messages and messages previously transmitted to the specific party among the previously transmitted messages;
cause displaying of a first message list on the touch screen of the terminal;
cause displaying of a second message list on the touch screen of the terminal, wherein the first message list includes the previously received messages of only a single party, which is the specific party, and wherein the second message list includes the previously transmitted messages of only a single party, which is the specific party, and wherein the first message list is distinct from the second message list;
cause simultaneously displaying of message received dates and message transmission dates on the touch screen, wherein the message received dates and the message transmission dates are displayed to be aligned vertically, relative to each other, and at locations within the first message list and the second message list;
provide a message input mode responsive to user input, wherein the message input mode permits user entry of a message for sending to the specific party, wherein the message input mode is provided after the first message list and the second message list have been displayed for a period of time, and wherein during the period of time, no message editing interface is displayed;
cause displaying of, while in the message input mode, content associated with a message of the first message list on the first display portion of the terminal; and
cause displaying of, while in the message input mode, the message editing interface on the second display portion of the terminal, wherein the message editing interface includes a soft keypad.

5. The mobile communication terminal of claim 4, further comprising an input unit configured for voice input and voice recognition, wherein a command is input by a voice via the input unit.

6. The mobile communication terminal of claim 4, further comprising an input unit configured for voice input and voice recognition, wherein the response message is prepared by a voice via the input unit.

7. The mobile communication terminal of claim 6, wherein the voice input via the input unit is converted into a corresponding text to be displayed on the message editing interface.

8. The mobile communication terminal of claim 4, further comprising an input unit for inputting several kinds of information.

9. The mobile communication terminal of claim 8, wherein the input unit includes a keypad via which the several kinds of information can be input.

10. The mobile communication terminal of claim 8, wherein the input unit is configured for voice input and voice recognition, and wherein the several kinds of information can be input by a voice via the input unit.

11. The mobile communication terminal of claim 4, wherein at least a portion of a content of the received message from the specific party can be copied and pasted into the message editing interface.

* * * * *